(12) United States Patent
Barbas

(10) Patent No.: US 10,083,191 B2
(45) Date of Patent: Sep. 25, 2018

(54) DYNAMIC TEST CASE PRIORITIZATION FOR RELATIONAL DATABASE SYSTEMS

(71) Applicant: International Business Machines Corporation, Armonk, NY (US)

(72) Inventor: Pedro M. Barbas, Dunboyne (IE)

(73) Assignee: International Business Machines Corporation, Armonk, NY (US)

( * ) Notice: Subject to any disclaimer, the term of this patent is extended or adjusted under 35 U.S.C. 154(b) by 499 days.

(21) Appl. No.: 14/707,035

(22) Filed: May 8, 2015

(65) Prior Publication Data

US 2016/0328405 A1 Nov. 10, 2016

(51) Int. Cl.
 *G06F 7/00* (2006.01)
 *G06F 17/30* (2006.01)
(52) U.S. Cl.
 CPC .............. *G06F 17/30289* (2013.01)
(58) Field of Classification Search
 CPC ............. G06F 11/3684; G06F 11/3688; G06F 11/3676; G06F 17/30345; G06F 17/3053; G06F 17/30339; G06F 17/30595
 USPC ............ 707/607, 736, 751, 752; 714/25, 33, 714/38.1, 37, 45
 See application file for complete search history.

(56) References Cited

U.S. PATENT DOCUMENTS

| 8,365,147 | B2 * | 1/2013 | Grechanik | G06F 8/70 714/37 |
| 8,527,813 | B2 | 9/2013 | Budnik et al. | |
| 8,561,036 | B1 | 10/2013 | Beans et al. | |
| 2014/0351793 | A1 * | 11/2014 | Bartley | G06F 11/3676 717/124 |
| 2016/0162392 | A1 * | 6/2016 | Hu | G06F 11/3684 714/38.1 |

FOREIGN PATENT DOCUMENTS

| CN | 102254035 A | 11/2011 |
| CN | 103425683 A | 12/2013 |
| CN | 103500142 A | 1/2014 |

OTHER PUBLICATIONS

Barbas, Pedro, M., "Dynamic Test Case Prioritization for Relational Database Systems", U.S. Appl. No. 15/196,202, filed Jun. 29, 2016, 28 pages.

(Continued)

*Primary Examiner* — Md I Uddin
(74) *Attorney, Agent, or Firm* — Gilbert Harmon, Jr.

(57) ABSTRACT

Aspects of the present invention disclose a method, computer program product, and system for prioritizing test cases for relational database systems. The method includes identifying one or more data tables within a relational database. The method further includes identifying an exclusivity value for each of the one or more identified data tables. The method further includes calculating a table weight for each of the one or more identified data tables. The method further includes prioritizing the one or more identified data tables based on the respective calculated table weights. The method further includes identifying one or more sequences of database statements corresponding to the prioritized data tables, wherein a database statement is a command executed on one of the prioritized data tables. The method further includes prioritizing the one or more identified sequences based on the corresponding database statements.

11 Claims, 5 Drawing Sheets

(56) References Cited

OTHER PUBLICATIONS

IBM Appendix P, list of patents and patent applications treated as related, Jun. 29, 2016, 2 pages.
Burguillo et al., "Heuristic-driven Techniques for Test Case Selection", pp. 51-66, © 2002 Published by Elsevier Science B.V.
Catal et al., "Test case prioritization: a systematic mapping study", Published on-line: Jul. 26, 2012, © Springer Science+Business Media, LLC 2012, DOI 10.1007/s11219-012-9181-z, pp. 445-478.
Ciupa et al., "ARTOO: Adaptive Random Testing for Object-Oriented Software", ISCE'08, May 10-18, 2008, Copyright 2008 ACM, 978-1-60558-079-1/08/05, pp. 1-10.
Ciupa et al., "Experimental Assessment of Random Testing for Object-Oriented Software", ISSTA'07, Jul. 9-12, 2007, London England, United Kingdom, Copyright 2007 ACM, 978-1-59583-734-6/07/0007, pp. 1-10.
Cohen, et al., "The AETG System: An Approach to Testing Based on Combinatorial Design", IEEE Transactions on Software Engineering, vol. 23, No. 7, Jul. 1997, © 1997 IEEE, pp. 437-444.
Godefroid et al., "DART: Directed Automated Random Testing", PLDI'2005, Jun. 2005, pp. 1-25.
Harrold et al., "A Methodology for Controlling the Size of a Test Suite", © 1993 ACM 1049-331X/93/0700-0270, ACM Transactions on Software Engineering and Methodology, vol. 2, No. 3, Jul. 1993, pp. 270-285.
Hennessy et al., "An Analysis of Rule Coverage as a Criterion in Generating Miniminal Test Suites for Grammar-Based Software", Accepted for the 20th IEEE/ACM International Conference on Automated Software Engineering Long Beach, California, USA, Nov. 7-11, 2005, pp. 1-10.
Howden et al., "A Functional Approach to Program Testing and Analysis", IEEE Transactions on Software Engineering, vol. SE-12, No. 10, Oct. 1986, © 1986 IEEE, pp. 997-1005.
Hsueh et al., "Cross feature testing in database systems", Microsoft SQL Server, SIGMOD DBTest 2008, Jun. 13, 2008, pp. 1-20.
IBM et al., "IBM Knowledge Center", CLP commands, noted by Inventor in Main Idea dated Oct. 29, 2014, <http://www-01.ibm.com/support/knowledgecenter/SSEPGG_10.5.0/com.ibm.db2.luw.admin.cmd.doc/com.ibm.db2.luw.admin.cmd.doc-gentopic3.html?cp=SSEPGG_10.5.0%2F3-5-2-4&lang=en>.
IBM et al., "IBM Knowledge Center", SQL statements, noted by Inventor in Main Idea dated Oct. 29, 2014, <http://www-01.ibm.com/support/knowledgecenter/SSEPGG_10.5.0/com.ibm.db2.luw.sql.ref.doc/doc/r0011049.html?cp=SSEPGG_10.5.0%2F2-9-7&lang=en>.
Jeffrey, et al., "Test Suite Reduction with Selective Redundancy", In Proceedings of the 21st IEEE International Conference on Software Maintenance (ICSM'05), Budapest Hungary, pp. 549-558, Sep. 2005.
Jones et al., "Test-Suite Reduction and Prioritization for Modified Condition/Decision Coverage", In IEEE Trans. on Software Engineering (TSE'03), vol. 29, No. 3, pp. 195-209, Mar. 2003.
Miller et al., "Systematic Mistake Analysis of Digital Computer Programs", Communications of the ACM, 1963, pp. 58-63.
Myers et al., "The Art of Software Testing, 3rd Edition", ISBN: 978-1-118-03196-4, Nov. 2011.
Ronne, Jeffery Von, "Test Suite Minimization an Empirical Investigation", Presented May 28, 1999, pp. 1-87, <http://www.ics.uci.edu/~jronne/pubs/jvronneuhc-thesis.pdf>.
Rothermel et al., "Empirical Studies of Test-Suite Reduction*", Oct. 24, 2002, This paper is a revised and expanded version of a paper presented at the International Conference on Software Maintenance, Nov. 1998 [15], pp. 1-31.
Rothermel et al., "Prioritizing Test Cases for Regression Testing", IEEE Transactions on Software Engineering, vol. 27, No. 10, Oct. 2001, pp. 929-948, © 2001 IEEE.
Saraph et al., "Test Case Generation and Reduction by Automated Input-Output Analysis*", pp. 768-773, 0-7803-7952-7/03, © 2003 IEEE.
Sharma et al., "Regression Test Case Selection for Testing Database Applications", International Journal of Innovative Technology and Exploring Engineering (IJITEE), ISSN: 2278-3075, vol. 3, Issue-1, Jun. 2013, pp. 212-216.
Walcott et al., "Performing Regression Test Prioritization for Time-Constrained Execution Using a Genetic Algorithm", Fall 2004, pp. 1-18.
Watson et al., "Structured Testing: A Testing Methodology Using the Cyclomatic Complexity Metric", McCabe Software, NIST Special Publication 500-235, Sep. 1996, pp. 1-124.
White, Lee J., "Software Testing and Verification", Advances in Computers, vol. 26, Copyright © 1987 by Academic Press, Inc., pp. 335-391.
"IEEE Standard Glossary of Software Engineering Terminology", IEEE Std 610.12-1990, Standards Coordinating Committee of the Computer Society of the IEEE, Approved Sep. 28, 1990, ISBN 1-55937-067-X, Copyright © 1990, pp. 1-84.
"Test Case Prioritization of Database Operations" Chapter 5, pp. 106-127, noted in Search Report dated Jan. 22, 2015, <http://shodhganga.inflibnet.ac.in/bitstream/10603/11700/10/10 chapter%205.pdf>.

* cited by examiner

300

| Table Name | Inserts | Updates | Deletes | Total Records |
|---|---|---|---|---|
| Employee | 20 | 5 | 5 | 567 |
| Manager | 10 | 10 | 20 | 10 |
| Salary | 30 | 15 | 5 | 98 |

Sequence 1: TABLE -> INDEX -> LOAD -> TRIGGER -> INDEX -> REORG -> TABLESPACE -> BUFFERPOOL
Sequence 2: TABLE -> INDEX -> LOAD -> TRIGGER -> INDEX -> RUNSTATS -> TABLESPACE -> BUFFERPOOL
Sequence 3: TABLE -> INDEX -> LOAD -> TRIGGER -> MASK -> TABLESPACE -> BUFFERPOOL
Sequence 4: TABLE -> CONSTRAINT -> INGEST-> TRIGGER -> INDEX -> REORG -> TABLESPACE -> BUFFERPOOL
Sequence 5: TABLE -> CONSTRAINT -> INGEST -> TRIGGER -> INDEX -> RUNSTATS -> TABLESPACE -> BUFFERPOOL
Sequence 6: TABLE -> CONSTRAINT -> INGEST -> TRIGGER -> MASK -> TABLESPACE -> BUFFERPOOL
Sequence 7: TABLE -> CONSTRAINT -> FUNCTION -> TRIGGER -> INDEX -> REORG -> TABLESPACE -> BUFFERPOOL
Sequence 8: TABLE -> CONSTRAINT -> FUNCTION -> TRIGGER -> INDEX -> RUNSTATS -> TABLESPACE -> BUFFERPOOL
Sequence 9: TABLE -> CONSTRAINT -> FUNCTION -> TRIGGER -> MASK -> TABLESPACE -> BUFFERPOOL
Sequence 10: TABLE -> VIEW -> TRIGGER -> INDEX -> REORG -> TABLESPACE -> BUFFERPOOL
Sequence 11: TABLE -> VIEW -> TRIGGER -> INDEX -> RUNSTATS -> TABLESPACE -> BUFFERPOOL
Sequence 12: TABLE -> VIEW -> TRIGGER -> MASK -> TABLESPACE -> BUFFERPOOL

FIG. 3B

DYNAMIC TEST CASE PRIORITIZATION FOR RELATIONAL DATABASE SYSTEMS

BACKGROUND OF THE INVENTION

The present invention relates generally to the field of database testing, and more specifically to dynamically prioritizing test cases in a relational database system.

A relational database is a digital database whose organization is based on the relational model of data. The relational model organizes data into one or more tables (or "relations") of rows and columns, with a unique key for each row. Generally, each entity type described in a database has its own table, the rows representing instances of that type of entity and the columns representing values attributed to that instance. Because each row in a table has its own unique key, rows in a table can be linked to rows in other tables by storing the unique key of the row to which it should be linked. The unique key of the row to which another row should be linked is referred to as a foreign key. With regards to relational databases, test cases correspond to individual tables from within the relational database that will be tested to determine the database's stability. Database commands are executed with relation to the test cases, and if the results of these commands are as expected, then the database may be considered to be functioning properly.

SUMMARY

Aspects of the present invention disclose a method, computer program product, and system for prioritizing test cases for relational database systems. The method includes one or more processors identifying one or more data tables within a relational database. The method further includes one or more processors identifying an exclusivity value for each of the one or more identified data tables. The method further includes one or more processors calculating a table weight for each of the one or more identified data tables, wherein the table weight is calculated by dividing the exclusivity of the table by a number of available resources utilized to perform a test suite of the data table. The method further includes one or more processors prioritizing the one or more identified data tables based on the respective calculated table weights. The method further includes one or more processors identifying one or more sequences of database statements corresponding to the prioritized data tables, wherein a database statement is a command executed on one of the prioritized data tables. The method further includes one or more processors prioritizing the one or more identified sequences based on the corresponding database statements.

BRIEF DESCRIPTION OF THE DRAWINGS

FIG. 3A is a table depicting examples of operations conducted on workload tables in accordance with one embodiment of the present invention;

FIG. 3B depicts an example sequence set in accordance with one embodiment of the present invention;

DETAILED DESCRIPTION

Database testing, where a system under test is tested against all possible variations, is mostly not feasible due to the large size of the search space domain, limited resources, and strict time constraints. Since comprehensive tests are typically unable to be run, standard practice is to select test cases from the large search space domain. These test cases should ideally represent the whole domain for the purpose of evaluating the structural and functional properties of the database. Test case selection is therefore a critical element in executing an adequate test of a database system.

Embodiments of the present invention enable improved test case selection in relational database systems. Tables within the database are identified for prioritization, and the tables are then analyzed to identify attributes of interest (such as exclusivity or processing requirements). The tables may also be analyzed to identify database commands associated with each table. Based on the results of this analysis, the tables are grouped and prioritized such that high priority tables with different characteristics can be tested to provide a more comprehensive test of a relational database system.

Implementation of embodiments of the invention may take a variety of forms, and exemplary implementation details are discussed subsequently with reference to the Figures. The present invention will now be described in detail with reference to the Figures.

Figure 1:
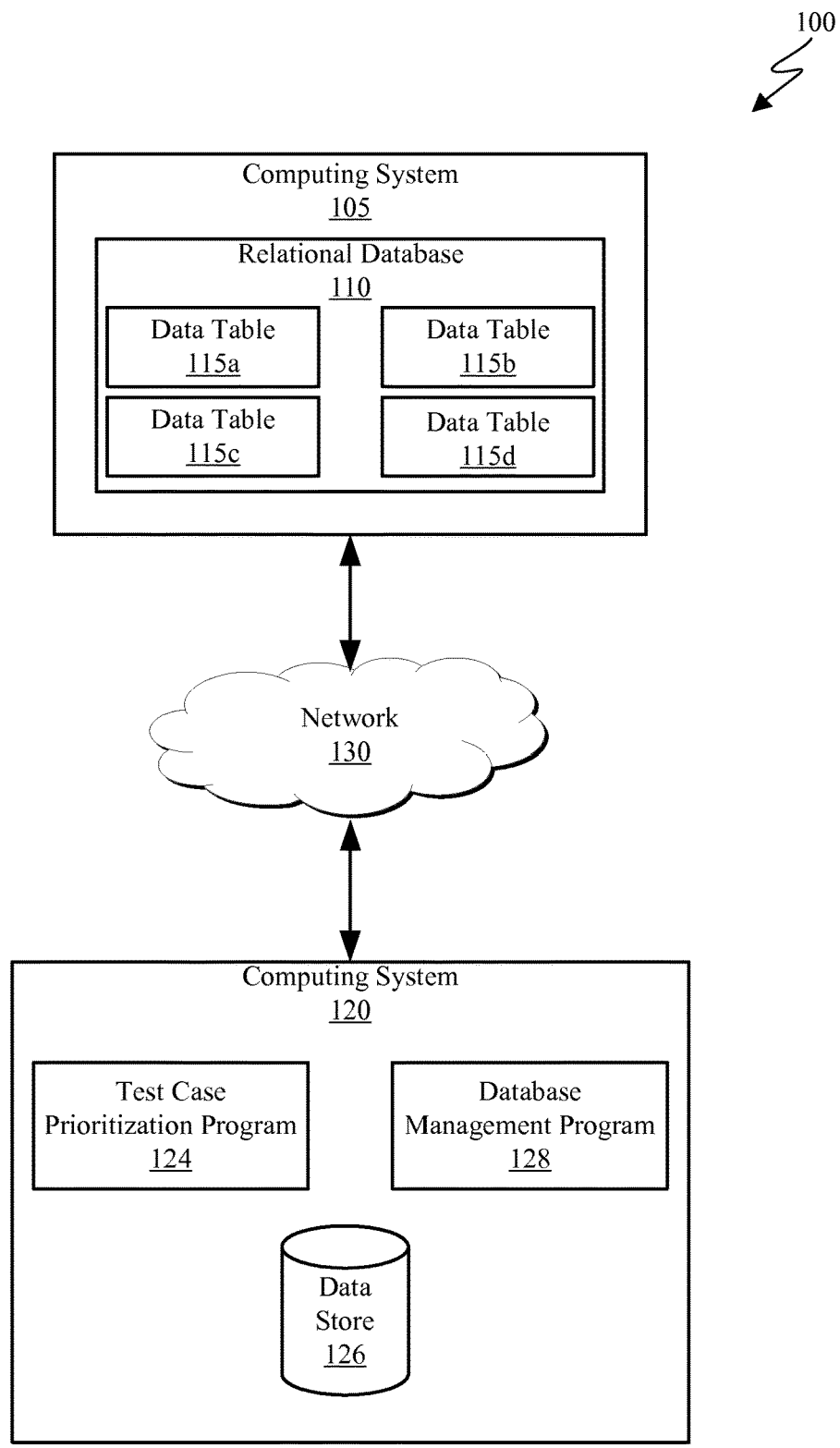
FIG. 1 is a functional block diagram depicting a computing environment in accordance with some embodiments of the present invention.

FIG. 1 is a functional block diagram depicting a computing environment 100 in accordance with some embodiments of the present invention. As depicted, computing environment 100 includes computing system 105 and computing system 120. Computing system 105 and computing system 120 can be desktop computers, laptop computers, specialized computer servers, or any other computer systems known in the art. In certain embodiments, computing system 105 and computing system 120 represent computer systems utilizing clustered computers and components to act as a single pool of seamless resources when accessed through network 130. In general, computing system 105 and computing system 120 are representative of any electronic devices, or combination of electronic devices, capable of executing machine readable program instructions, as described in greater detail with regard to FIG. 4.

Computing system 105 includes relational database 110. Relational database 110 can be a central storage location for information organized in such a way that a computer program, such as database management program 128, can select, modify, and story desired pieces of data. Relational databases are configured to store data in any number of data tables, such as data tables 115a-115d in the depicted embodiment. Relational database 110 can be stored on any storage media known in the art. For example, relational database 110 can be stored on a tape library, optical library, one or more independent hard disk drives, or multiple hard disk drives in a redundant array of independent disks (RAID).

Computing system 120 includes test case prioritization program 124, data store 126, and database management program 128. Database management program 128 monitors activity conducted on relational database 110 via network 130 (e.g., using TCP/IP). Database management program 128 may save monitored activity conducted on relational database 110 in a usage file in data store 126. Data store 126 can be implemented using any storage media known in the art.

Test case prioritization program 124 prioritizes data tables and sequences corresponding to relational database 110 for testing. Test case prioritization program 124 may utilize monitoring information received from database management program 128 to determine which tables and sequences corresponding to relational database 110 are most adequate to be test cases. The prioritization of the sequences and data tables occurs according to the method discussed in greater detail with respect to FIG. 2.

In one embodiment, computing system 105 and computing system 120 communicate through network 130. Network 130 can be, for example, a local area network (LAN), a telecommunications network, a wide area network (WAN), such as the Internet, or any combination of the three, and include wired, wireless, or fiber optic connections. In general, network 130 can be any combination of connections and protocols that will support communications between computing system 105 and computing system 120, in accordance with embodiments of the present invention.

Figure 2:
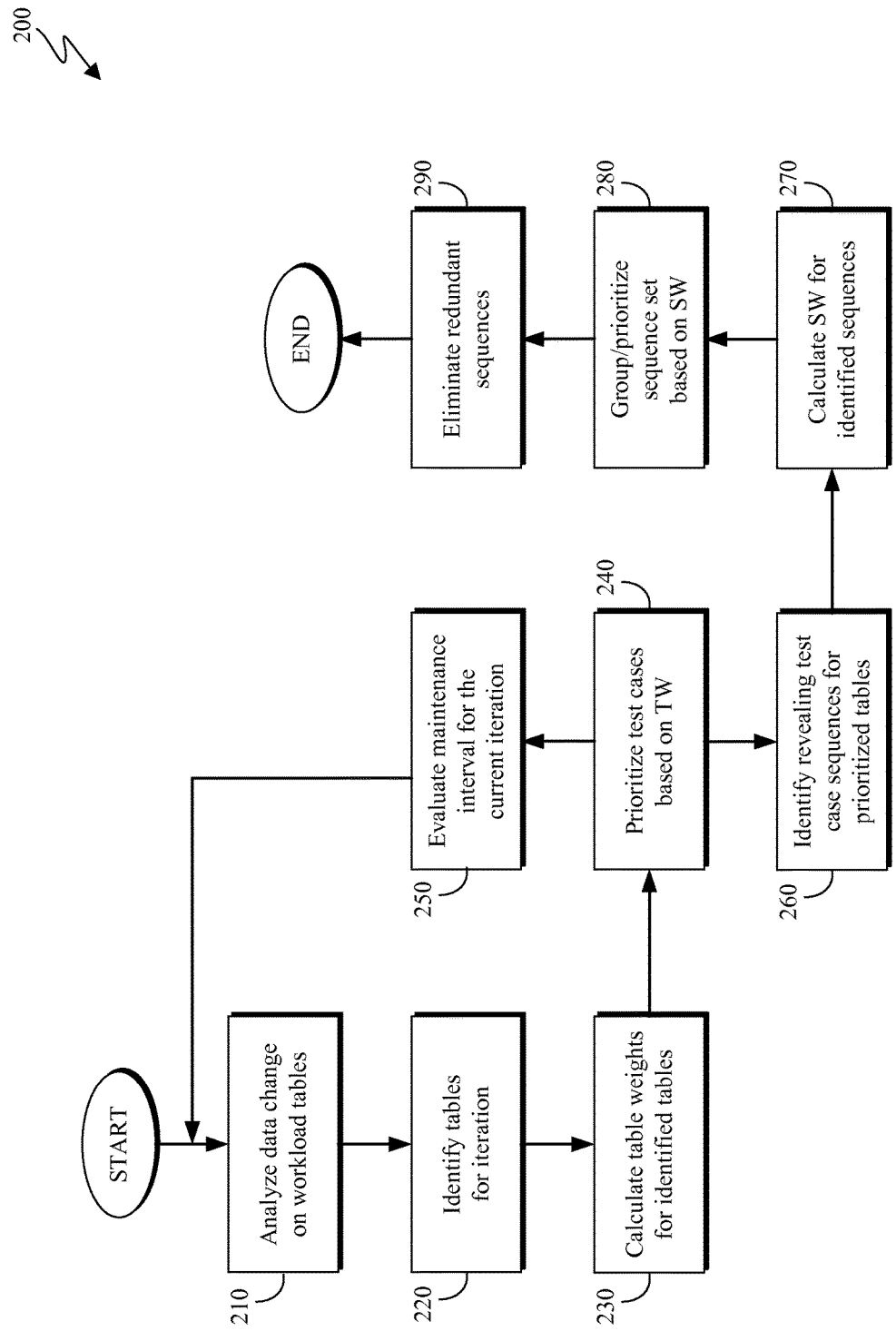
FIG. 2 is a flowchart depicting a test case prioritization method in accordance with some embodiments of the present invention.

FIG. 2 is a flowchart depicting a test case prioritization method 200 in accordance with some embodiments of the present invention. As depicted, the method includes analyzing (step 210) data change amounts on workload tables, identifying (step 220) tables for iteration, calculating (step 230) a table weight, prioritizing (step 240) test cases based on the calculated table weight, evaluating (step 250) a maintenance interval for a current iteration, identifying (step 260) revealing test case sequences, calculating (step 270) a sequence weight, grouping (step 280) sequences into classes based on the calculated sequence weights, and eliminating (step 290) redundant sequences. Test case prioritization method 200 may enable dynamic test case prioritization in a database management system (DBMS) that includes a plurality of database tables managed by the DBMS in the context of a database workload. In one embodiment, test case prioritization method 200 is executed by test case prioritization program 124.

In step 210, test case prioritization method 200 analyzes the data change on workload tables. For example, test case prioritization method 200 analyzes how much data has changed on a given data table compared to a last time that test case prioritization method 200 performed an analysis for the same table. If test case prioritization method 200 is analyzing the table for the first time, then test case prioritization method 200 analyzes the data in the table to provide a baseline for comparison for the next iteration. In one embodiment, test case prioritization method 200 analyzes data change by identifying LOAD operations and IUD (insert/update/delete) operations corresponding to the table. The identified LOAD operations and IUD operations may be counted and used in step 230 to determine a table weight. In an embodiment corresponding to the computing system 105 depicted in FIG. 1, test case prioritization program 124 analyzes monitoring activity stored in a usage file in data store 126 to determine how much data has changed on data table 115a, data table 115b, data table 115c, and data table 115d.

FIG. 3A depicts table 300, which includes examples of operations conducted on workload tables in accordance with one embodiment of the present invention. Table 300 depicts three data tables, named 'Employee,' 'Manager,' and 'Salary,' along with a corresponding number of insert operations, update operations, and delete operations that were conducted on each table in a monitored period. The monitored records are used by test case prioritization method 200 to calculate the table weight for each table.

In step 220, test case prioritization method 200 identifies tables for iteration. The tables identified for iteration may include tables that were found to have high LOAD/IUD operation counts in step 210, and may therefore be highly trafficked tables within the database. In one embodiment, a predetermined threshold is defined to indicate how many LOAD/IUD operations must be executed on a table for the table to be selected for iteration. Additionally, the tables identified for iteration may include tables that were analyzed for the first time in step 210, which correspond to tables for which data change has not yet been analyzed. In an embodiment corresponding to the computing system 105 depicted in FIG. 1, test case prioritization program 124 identifies data table 115b and 115c as tables that had LOAD/IUD operation counts above the defined threshold. Test case prioritization program 124 therefore identifies data table 115b and data table 115c for iteration.

In step 230, test case prioritization method 200 calculates a table weight (TW). The table weight is a value that corresponds to how a table in a database workload should be prioritized. Test case prioritization method 200 can calculated the table weight based on a number of different attributes. In one embodiment, test case prioritization method 200 calculates the table weight (TW) according to the ratio between the exclusivity of the table and the cost to test the table. Exclusivity is an indication of the percentage of rows persisted by insert/update/delete (IUD) loads. Test case prioritization method 200 can calculate exclusivity by calculating the sum of distinct values in IUD operations and dividing that sum by the total number of rows in the table. Test cost is an estimation of the resources that should be considered to perform a specific test suite. For example, test case prioritization method 200 may have received information indicating that the total cost of operations for a particular test suite should make up approximately 20% of the database memory resources, in which case the test cost value is established to be 0.2.

In the case of the data tables discussed with respect to FIG. 3A, test case prioritization method 200 determines the table weights as follows. The 'Employee' table has 30 IUD operations and 567 total records, so utilizing a test cost value of 0.2, test case prioritization method 200 calculates the 'Employee' table weight $TW_E=(30/567)*(0.2)=0.01$. The 'Manager' table has 40 IUD operations and 10 total records, so utilizing a test cost value of 0.2, test case prioritization method 200 calculates the 'Manager' table weight $TW_M=(40/10)*(0.2)=0.8$. The 'Salary' table has 50 IUD operations and 98 total records, so utilizing a test cost value of 0.2, test case prioritization method 200 calculates the 'Salary' table weight $TW_S=(50/98)*(0.2)=0.1$.

In step 240, test case prioritization method 200 prioritizes test cases based on the calculated table weight. Prioritization may occur in a number of different ways. In one embodiment, test case prioritization method 200 orders and prioritizes the tables from 1 to N (with N being the total number of tables) according to the corresponding table weights. In said embodiment, test case prioritization method 200 selects tables to be test cases in order beginning with the highest priority table. In another embodiment, a table weight threshold is set, and test case prioritization method 200 considers any table that exceeds this predetermined threshold to be prioritized. In one embodiment, test case prioritization method 200 can save a file containing information regarding which tests are prioritized to data store 126. In various embodiments, test case prioritization method 200 selects tables to be test cases from only the group of prioritized tables. From step 240, test case prioritization method 200 continues to step 250 and step 260 simultaneously.

In the case of the data tables discussed with respect to FIG. 3A, test case prioritization method 200 determines the prioritization of the tables as follows. In one embodiment, test case prioritization method 200 prioritizes the three tables in order of their calculated table weights. The 'Manager' table would receive highest priority, the 'Salary' table would be prioritized second, and the 'Employee' table would receive lowest priority. In a different embodiment where a table weight threshold has been set at a value of 0.2, only the 'Manager' table would be prioritized, as the 'Manager' table is the only table for which the calculated table weight (0.8) exceeded the threshold of 0.2.

In step 250, test case prioritization method 200 evaluates a maintenance interval for a current iteration. In one embodiment, test case prioritization method 200 performs the maintenance interval based on a schedule (e.g., after a predefined time period after the last interval, every 20 minutes, etc.). In this case, evaluating the maintenance interval includes determining if the indicated amount of time has passed, and if it is therefore time to begin the process again. Certain tables may have sporadic but very high growth resulting from ingest or LOAD operations or a high volume of insert commands. In another embodiment, the maintenance interval is executed immediately in response to a sudden change in size and the process starts over. Once test case prioritization method 200 executes the maintenance interval, the method stops and begins again at step 210.

In step 260, test case prioritization method 200 identifies revealing test case sequences. Revealing sequences are sequences that represent the most sensitive and critical areas of the system. Revealing sequences are therefore the sequences most likely to uncover problems when processed by the database system. Test case prioritization program 200 adds the identified sequences to a sequence set that is generated according to database statements and database commands. Database statements may be, for example, SQL statements used to manipulate database objects. A database statement may be used to create a database table or rename a database index. Similarly, database commands may be, for example, SQL commands used to manipulate actions. A database command may be used to activate a database or ingest data from an input file into a database table. FIG. 3B depicts an example of a sequence set 310 in accordance with one embodiment of the present invention.

In step 270, test case prioritization method 200 calculates a sequence weight (SW) for each identified sequence. Test case prioritization method 200 can calculate the sequence weight using a number of configurable formulas. In one embodiment, test case prioritization method 200 first calculates a statement weight for each database statement and each database command that appears in the sequence set. Test case prioritization method 200 can calculate the statement weight by dividing the number of occurrences of a statement or command by the total number of commands and statements in the sequence set. Then, test case prioritization method 200 can determine a sequence weight by calculating the summation of the statement weights for all the statements in a sequence.

Figure 3C:
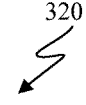
FIG. 3C is a table depicting example statement/command weights corresponding to the example sequence set depicted in FIG. 3B in accordance with one embodiment of the present invention.

FIG. 3C depicts table 320, which includes example statement/command weights corresponding to example sequence set 310 depicted in FIG. 3B in accordance with one embodiment of the present invention. Table 320 depicts twelve different statements and commands that appear in sequence set 310 depicted in FIG. 3B (i.e., sequence 1 through sequence 12), as well as how many times each statement appears (i.e., a number of occurrences of each statement). Table 320 also depicts the statement weight, calculated according to the ratio of appearances of each individual statement to the total number of statements in the sequence set 310. In the depicted example, there are 89 total statements, therefore test case prioritization method 200 calculates each statement weight by dividing the occurrences of a statement by 89.

In step 280, test case prioritization method 200 groups sequences into classes based on the calculated sequence weights. In one embodiment, each class contains sequences that all have the same calculated sequence weight. In another embodiment, each class contains sequences whose calculated sequence weights all fall within a certain range (e.g., sequence weight between 0.11 and 0.15). Test case prioritization method 200 prioritizes the set of sequences based on the classes. In one example, for any class with only one sequence, test case prioritization method 200 assigns the corresponding sequence a low priority. In another example, for any class with multiple sequences, test case prioritization method 200 assigns the sequence in the class with the highest sequence weight a high priority, and assigns the rest of the sequences in the class a given medium priority. In yet another example, if the sequences in a class all have the same weight, test case prioritization method 200 randomly chooses one of the sequences and assigns a high priority, and assigns the rest of the sequences a medium priority.

Figure 3D:
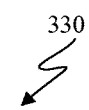
FIG. 3D is a table depicting example grouping and prioritization of statements/commands corresponding to the example sequence set depicted in FIG. 3B in accordance with one embodiment of the present invention.

FIG. 3D depicts a table 330, which includes example grouping and prioritization of sequences corresponding to the example sequence set 310 depicted in FIG. 3B in accordance with one embodiment of the present invention. Table 330 depicts the weights of each of the sequences from sequence set 310, as well as how the sequences have been grouped and prioritized based on the calculated weights. The sequences with the same weight are grouped into the same class, and only one sequence from each class containing multiple sequences is given high priority (e.g., sequence 1 from class 1, sequence 10 from class 3, etc.) with the rest of the sequences in these classes receiving medium priority. Sequences that were placed in a class alone (e.g., sequence 4 from class 2) received low priority. Based on table 330, in a test suite, sequence 1, sequence 9, and sequence 3 will be executed first, followed by sequences 2, 5, 6, 7, 8, 10, 11, and 12, and sequence 4 would be the last to be executed. Since database testing may be done under time constraints, execution in this order ensures that the highest priority sequences are most likely to be executed within the time allotted, and the lowest priority sequences are the most likely to be left out.

In step 290, test case prioritization method 200 eliminates redundant sequences. Test case prioritization method 200 considers a sequence to be redundant if a combination of other sequences contain all the subsequences present in said sequence. For example, with respect to sequence set 310, sequence 2 can be broken into two subsequences:

1) TABLE→INDEX→LOAD→TRIGGER→INDEX
2) RUNSTATS→TABLESPACE→BUFFERPOOL

Both of the above subsequences exist in other sequences; subsequence 1 can be found in sequence 1, and subsequence 2 can be found in sequence 5. Therefore, test case prioritization method 200 identifies sequence 2 as redundant, and removes sequence 2 from the list entirely. Removing redundant sequences in this manner leaves a prioritized group of unique sequences to be tested with respect to each prioritized table.

Figure 4:
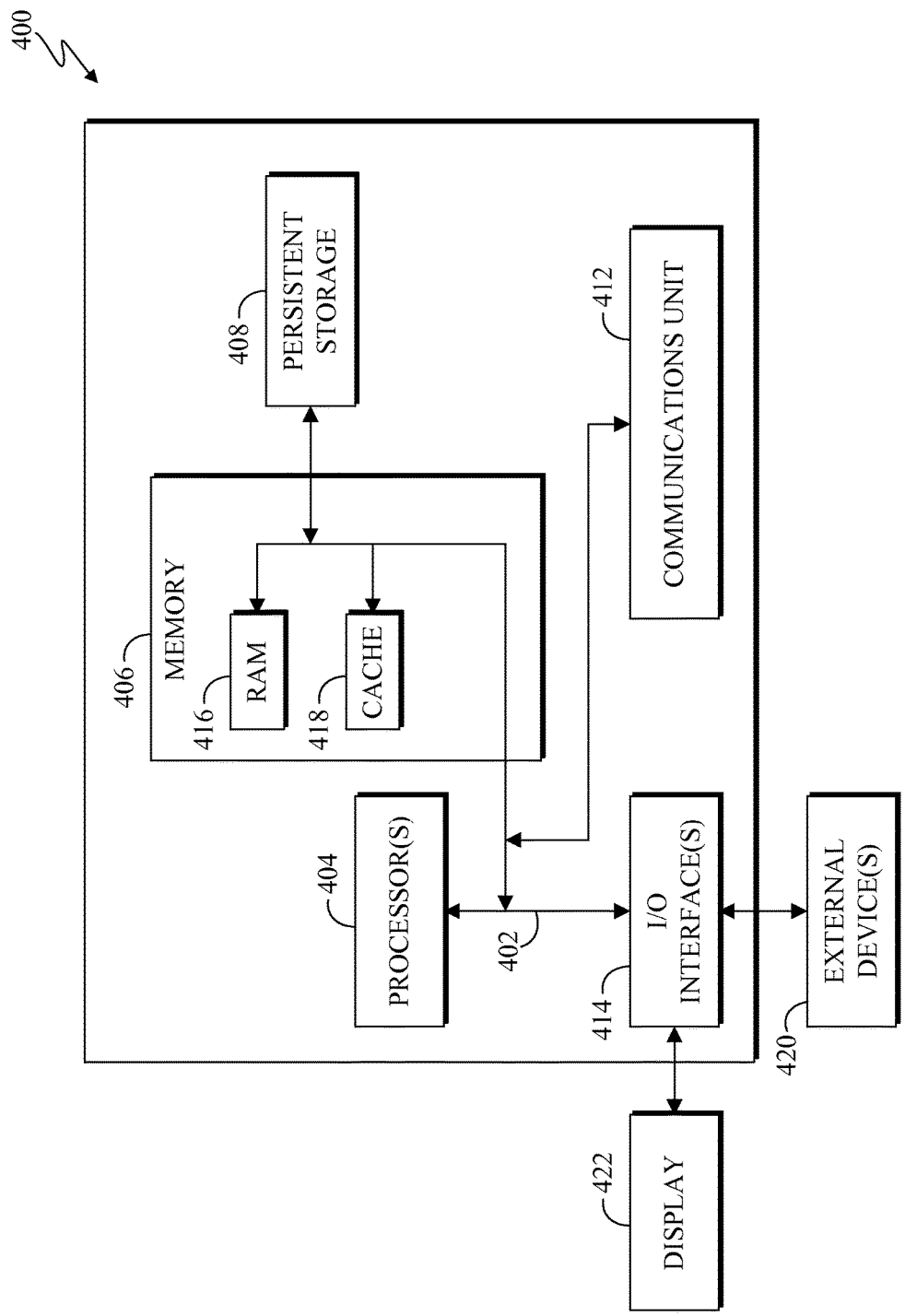
FIG. 4 depicts a block diagram of components of a computer, in accordance with some embodiments of the present invention.

FIG. 4 depicts a block diagram of components of computer 400 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

As depicted, the computer 400 includes communications fabric 402, which provides communications between computer processor(s) 404, memory 406, persistent storage 408, communications unit 412, and input/output (I/O) interface(s) 414. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 416 and cache memory 418. In general, memory 406 can include any suitable volatile or non-volatile computer-readable storage media.

One or more programs may be stored in persistent storage 408 for access and/or execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 412, in these examples, provides for communications with other data processing systems or devices. In these examples, communications unit 412 includes one or more network interface cards. Communications unit 412 may provide communications through the use of either or both physical and wireless communications links.

I/O interface(s) 414 allows for input and output of data with other devices that may be connected to computer 400. For example, I/O interface 414 may provide a connection to external devices 420 such as a keyboard, keypad, a touch screen, and/or some other suitable input device. External devices 420 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 408 via I/O interface(s) 414. I/O interface(s) 414 also connect to a display 422.

Display 422 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer program product for prioritizing test cases, the computer program product comprising:
    one or more computer readable storage media and program instructions stored on the one or more computer readable storage media, the program instructions comprising instructions to:
    identify one or more data tables within a relational database;
    identify an exclusivity value for each of the one or more identified data tables, wherein the exclusivity value indicates a percentage of rows persisted by insert/update/delete operations;
    calculate a table weight for each of the one or more identified data tables, wherein the table weight is calculated by dividing the exclusivity of the table by a number of resources utilized to perform a test suite of the data table;
    prioritize the one or more identified data tables based on the respective calculated table weights;
    identify one or more sequences of database statements corresponding to the prioritized data tables, wherein a database statement is a command executed on one of the prioritized data tables;
    calculate a statement weight for each statement in the one or more identified sequences by dividing a number of occurrences of a statement by a total number of occurrences of all statements in the identified sequences;
    calculate a sequence weight for each identified sequence by calculating the sum of the statement weights in each identified sequence;
    prioritize the one or more identified sequences based on the calculated sequence weights; and
    test the one or more identified sequences according to the prioritization.

2. The computer program product of claim 1, wherein the number of resources utilized to perform a test suite of the data table correspond to a percentage of available processing resources that a test suite is capable of utilizing.

3. The computer program product of claim 1, wherein program instructions to identify data tables within a relational database further comprise program instructions to:
    analyze data change amounts on data tables within a relational database; and
    select the data tables with the highest amount of data change.

4. The computer program product of claim 1, wherein program instructions to analyze data change amounts comprise program instructions to count a number of insert, update, and delete operations as well as instructions to count a number of LOAD operations corresponding to each data table.

5. The computer program product of claim 1, wherein program instructions to prioritize the identified data tables further comprise program instructions to:
   prioritize the identified data tables in order, from highest table weight to lowest table weight.

6. The computer program product of claim 1, wherein program instructions to prioritize the identified data tables further comprise program instructions to:
   determine whether a data table has a corresponding table weight that is greater than a predetermined threshold; and
   responsive to determining that the data table has a corresponding table weight that is greater than a predetermined threshold, program instructions to assign the data table a high priority.

7. A computer system for prioritizing test cases, the computer system comprising:
   one or more computer processors;
   one or more computer-readable storage media;
   program instructions stored on the computer-readable storage media for execution by at least one of the one or more processors, the program instructions comprising instructions to:
   identify one or more data tables within a relational database;
   identify an exclusivity value for each of the one or more identified data tables, wherein the exclusivity value indicates a percentage of rows persisted by insert/update/delete operations;
   calculate a table weight for each of the one or more identified data tables, wherein the table weight is calculated by dividing the exclusivity of the table by a number of resources utilized to perform a test suite of the data table;
   prioritize the one or more identified data tables based on the respective calculated table weights;
   identify one or more sequences of database statements corresponding to the prioritized data tables, wherein a database statement is a command executed on one of the prioritized data tables;
   calculate a statement weight for each statement in the one or more identified sequences by dividing a number of occurrences of a statement by a total number of occurrences of all statements in the identified sequences;
   calculate a sequence weight for each identified sequence by calculating the sum of the statement weights in each identified sequence;
   prioritize the one or more identified sequences based on the calculated sequence weights; and
   test the one or more identified sequences according to the prioritization.

8. The computer system of claim 7, wherein program instructions to identify data tables within a relational database further comprise program instructions to:
   analyze data change amounts on data tables within a relational database; and
   select the data tables with the highest amount of data change.

9. The computer system of claim 7, wherein program instructions to analyze data change amounts comprise program instructions to count a number of insert, update, and delete operations as well as instructions to count a number of LOAD operations corresponding to each data table.

10. The computer system of claim 7, wherein program instructions to prioritize the identified data tables further comprise program instructions to:
    prioritize the identified data tables in order, from highest table weight to lowest table weight.

11. The computer system of claim 7, wherein program instructions to prioritize the identified data tables further comprise program instructions to:
    determine whether a data table has a corresponding table weight that is greater than a predetermined threshold; and
    responsive to determining that the data table has a corresponding table weight that is greater than a predetermined threshold, program instructions to assign the data table a high priority.

* * * * *